United States Patent
Muizelaar et al.

(10) Patent No.: US 8,640,846 B2
(45) Date of Patent: *Feb. 4, 2014

(54) FRICTION CLUTCH AND METHOD TO REDUCE DRAG LOSS IN FRICTION CLUTCH

(71) Applicants: Richard D. Muizelaar, Mississauga (CA); Sean Steele, Ontario (CA); Jianwen Li, Vaugham (CA); Andrew Kowalski, Toronto (CA)

(72) Inventors: Richard D. Muizelaar, Mississauga (CA); Sean Steele, Ontario (CA); Jianwen Li, Vaugham (CA); Andrew Kowalski, Toronto (CA)

(73) Assignee: Magna Powertrain Inc., Concord (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/908,163

(22) Filed: Jun. 3, 2013

(65) Prior Publication Data
US 2013/0256081 A1 Oct. 3, 2013

Related U.S. Application Data

(63) Continuation of application No. 12/919,020, filed as application No. PCT/CA2008/002164 on Dec. 15, 2008, now Pat. No. 8,459,432.

(51) Int. Cl.
*F16D 13/00* (2006.01)
*F16D 13/72* (2006.01)
*F16D 13/74* (2006.01)

(52) U.S. Cl.
USPC ............... 192/113.35; 192/85.61; 192/70.12

(58) Field of Classification Search
USPC .............................. 192/85.61, 113.35, 70.12
See application file for complete search history.

(56) References Cited

U.S. PATENT DOCUMENTS 8,459,432 B2 * 6/2013 Muizelaar et al. ....... 192/113.35

* cited by examiner

*Primary Examiner* — David D Le
*Assistant Examiner* — Colby M Hansen
(74) *Attorney, Agent, or Firm* — Dickinson Wright PLLC

(57) ABSTRACT

A wet clutch includes a rotatable hub and a rotatable drum having an aperture extending therethrough. A plurality of outer clutch plates are fixed for rotation with the drum. A plurality of inner clutch plates are fixed for rotation with the hub and interleaved with the outer clutch plates. A piston is moveable to apply a force to the inner and outer clutch plates to transfer torque between the hub and the drum. A cover is moveable relative to the drum between first and second positions. The cover selectively restricts a flow of fluid through the aperture in the drum when in the first position.

23 Claims, 2 Drawing Sheets

FRICTION CLUTCH AND METHOD TO REDUCE DRAG LOSS IN FRICTION CLUTCH

CROSS-REFERENCE

This application is a continuation of U.S. application Ser. No. 12/919,020 filed Aug. 24, 2010, now U.S. Pat. No. 8,459,432, which is a U.S. National Phase of PCT/CA2008/002164 filed Dec. 15, 2008 which claims the benefit of U.S. Provisional Application No. 60/032,110 filed on Feb. 28, 2008.

BACKGROUND

This present disclosure relates to a method and apparatus for reducing clutch drag loss. More particularly, a clutch having a moveable cover selectively restricting a flow of oil within the clutch is disclosed.

Typical wet clutches include a drum rotatable relative to a hub. A plurality of outer clutch plates are in driving engagement with the drum and a plurality of inner clutch plates are in driving engagement with the hub. The inner and outer clutch plates are interleaved with one another. Some friction plate clutches are designated as wet clutches and have oil positioned between the hub and the drum in contact with the inner and outer clutch plates. Wet clutches are typically operable in a disengaged mode where little to no torque is transferred between the drum and the hub and an engaged mode when torque is transferred between the clutch hub and the clutch drum.

When the known wet clutch is in the disengaged mode, oil may be pumped across the outer plates and the inner plates. Alternatively, oil is trapped between the hub and the drum and remains located between the hub and the drum during all modes of operation. As such, a certain amount of energy is required to shear the oil located between the inner and outer clutch plates when the clutch is in the disengaged mode. This energy may be referred to as clutch drag loss. Clutch drag loss therefore becomes a parasitic energy loss associated with vehicles operating with wet clutches of this design.

SUMMARY

A wet clutch includes a rotatable hub and a rotatable drum having an aperture extending therethrough. A plurality of outer clutch plates are fixed for rotation with the drum. A plurality of inner clutch plates are fixed for rotation with the hub and interleaved with the outer clutch plates. A piston is moveable to apply a force to the inner and outer clutch plates to transfer torque between the hub and the drum. A cover is moveable relative to the drum between first and second positions. The cover selectively restricts a flow of fluid through the aperture in the drum when in the first position.

Furthermore, a wet clutch includes a rotatable hub and a rotatable drum having an aperture extending therethrough. A plurality of outer clutch plates are fixed for rotation with the drum. A plurality of inner clutch plates are fixed for rotation with the hub and interleaved with the outer clutch plates. A piston is moveable to apply a force to the inner and outer clutch plates to transfer torque between the hub and the drum. A fluid path extends through the drum aperture, across the inner and outer clutch plates, and includes an exit passage. A cover is moveable relative to the drum between first and second positions. The cover selectively allows fluid flow through the fluid path when in the second position. The cover restricts flow through the aperture in the drum when in the first position to allow fluid to escape through the exit passage and reduce restriction to relative motion between the first and second clutch plates.

Additionally, a method of reducing drag loss in a wet clutch including a rotatable drum, a rotatable hub, a moveable piston, clutch plates and a moveable cover is disclosed. The method includes moving the piston to an advanced position to apply a force to the clutch plates and transfer torque between the hub and the drum. The method also includes moving the cover to allow fluid to flow through an aperture formed in the drum. Fluid flows past the clutch plates and out of the clutch. The piston is moved to a retracted position to discontinue torque transfer between the clutch and the hub. The cover is moved to restrict fluid flow through the aperture formed in the drum. Fluid previously positioned in communication with the clutch plates is moved to a location remote from the clutch plates to reduce the restriction to relative motion between the clutch and the hub.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figures 1, 2:
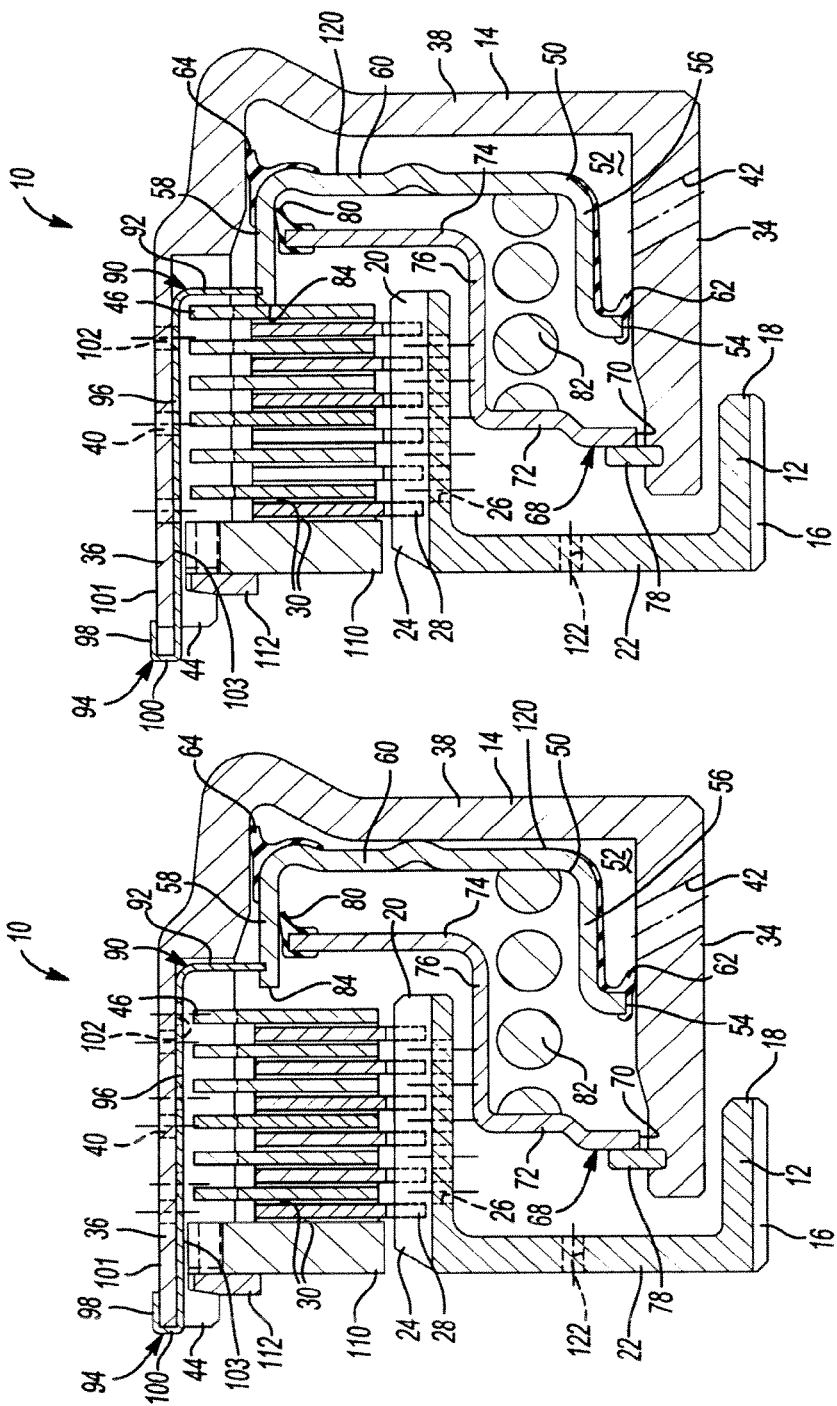
FIG. 1 is a fragmentary cross-sectional side view of a clutch assembly having a piston positioned in a retracted position.
FIG. 2 is a cross-sectional side view of the clutch assembly of FIG. 1 showing the piston assembly in an advanced position.
Figure 3:
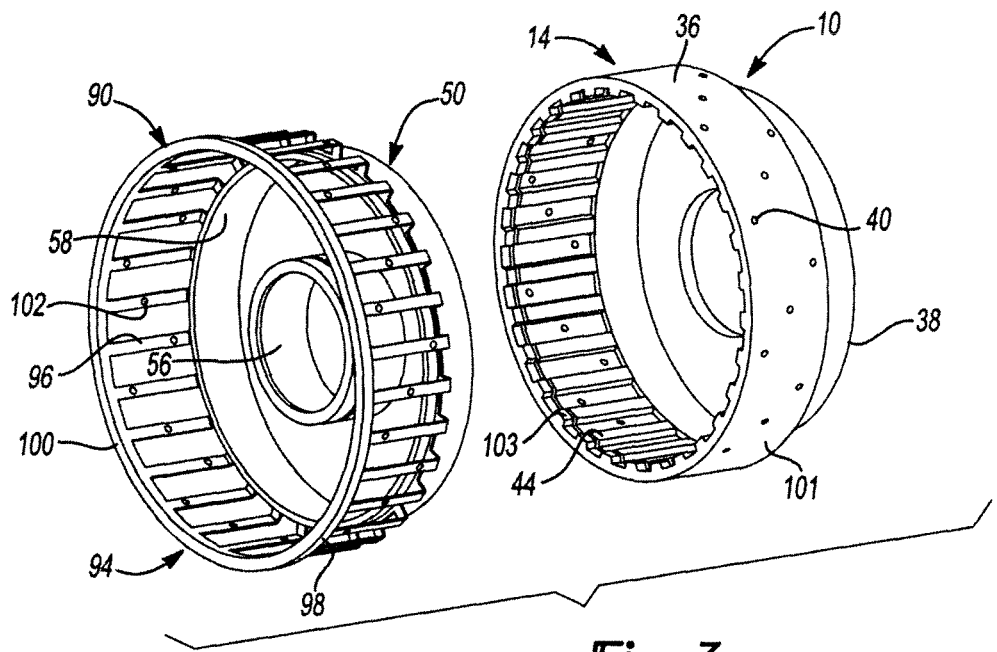
FIG. 3 is an exploded perspective view of the drum, piston and cover of the wet clutch depicted in FIGS. 1 and 2.
Figure 4:
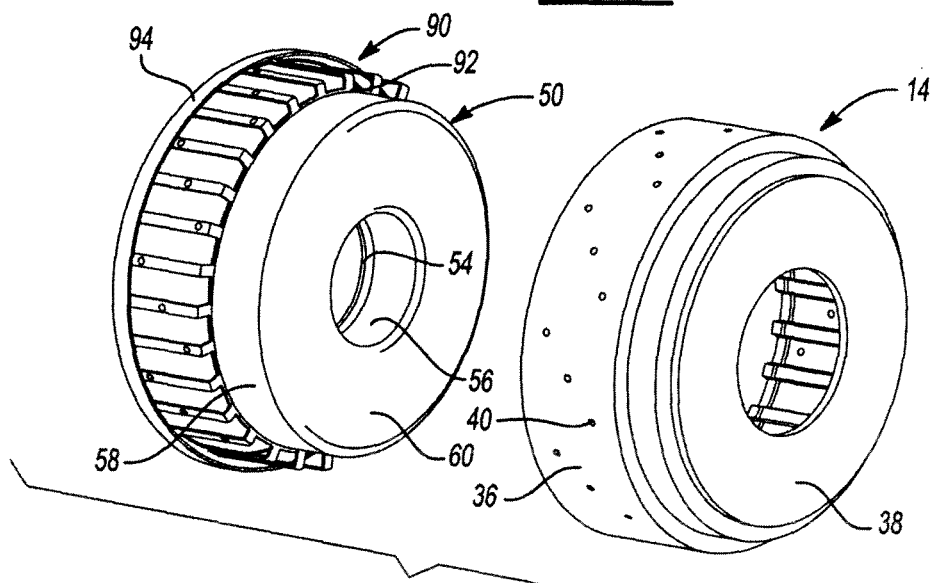
FIG. 4 is an exploded perspective view of the drum, piston and cover of the wet clutch of FIG. 1 taken from a different view point.

The following description is merely exemplary in nature and is not intended to limit the present disclosure, application, or uses. It should be understood that throughout the drawings, corresponding reference numerals indicate like or corresponding parts and features.

A clutch constructed in accordance with the teachings of the present disclosure is generally identified at reference numeral 10. Clutch 10 includes a hub 12 rotatable relative to a drum 14. Clutch 10 is operable to drivingly interconnect hub 12 and drum 14 to transfer torque therebetween. Hub 12 may be drivingly coupled to any number of driving or driven components by an internal spline 16 formed on an inner cylindrical portion 18. Similarly, drum 14 may be drivingly coupled to any number of other rotatable components to transfer torque thereto.

Hub 12 also includes an outer cylindrical portion 20 interconnected to inner cylindrical portion 18 by a radially extending web 22. An external spline 24 is formed on outer cylindrical portion 20. Radially extending hub apertures 26 extend through outer cylindrical portion 20. A plurality of inner clutch plates 28 are positioned in splined engagement with external spline 24 of hub 12. As such, inner clutch plates 28 are fixed for rotation with but axially moveable relative to hub 12. Each inner clutch plate 28 includes friction pads 30 fixed on opposing faces thereof.

Drum 14 includes an inner cylindrical wall 34 and an outer cylindrical wall 36 interconnected by a radially extending end wall 38. A plurality of drum apertures 40 radially extend through outer cylindrical wall 36. Apertures 40 may be circumferentially spaced apart and axially staggered relative to one another about the circumference of drum 14. A fluid supply port 42 extends through inner cylindrical wall 34. An internal spline 44 is formed on outer cylindrical wall 36. A plurality of outer clutch plates 46 are positioned in splined engagement with internal spline 44. Accordingly, outer clutch plates 46 are fixed for rotation with but axially moveable relative to drum 14. Outer clutch plates 46 are interleaved with inner clutch plates 28.

A piston 50 is positioned within a recess 52 formed by inner wall 34, outer wall 36 and end wall 38 of drum 14. Piston 50 is axially moveable relative to drum 14 and includes a central aperture 54 defined by a cylindrically shaped inner wall 56. A cylindrically shaped outer wall 58 is interconnected to inner wall 56 by a bottom wall 60. An inner seal 62 is fixed to inner wall 56 and engages inner cylindrical wall 34 of drum 14. An outer seal 64 is fixed to outer wall 58 of piston 50. Outer seal 64 engages outer wall 36 of drum 14.

A dam 68 is shaped as a circular member having a central aperture 70 extending therethrough. Dam 68 includes an inner radially extending flange 72 and an outer radially extending flange 74 interconnected by a cylindrical body 76. A snap ring 78 restricts dam 68 from moving relative to drum 14 in one direction. A dam seal 80 is fixed to outer flange 74 and engages outer wall 58 of piston 50. A return spring 82 is positioned between piston 50 and dam 68 to bias piston 50 toward a retracted position shown in FIG. 1. Piston 50 is moveable between the retracted position shown in FIG. 1 and an advanced position shown in FIG. 2. An engagement surface 84 of piston 50 is spaced apart from inner clutch plates 28 and outer clutch plates 46 when piston 50 is in the retracted position. When piston 50 is in the advanced position, engagement face 84 is in contact with one of outer clutch plates 46 to transfer torque between hub 12 and drum 14.

A cover 90 is a substantially cup-shaped member having a first or inner ring 92 fixed to piston 50. A second or outer ring 94 is interconnected to inner ring 92 by a plurality of axially extending and circumferentially spaced apart webs 96. Second ring 94 includes a cylindrically-shaped outer leg 98 axially extending from a plate portion 100. Second ring 94 partially envelopes an end portion of outer wall 36 to guide cover 90 during movement relative to drum 14. Outer leg 98 is positioned adjacent to an outer surface 101 of drum 14. Webs 96 are positioned adjacent to an inner surface 103 of drum 14. Cover 90 includes a plurality of cover apertures 102 extending therethrough. Apertures 102 are circumferentially spaced apart and axially offset from each other along adjacent webs in the same pattern that apertures 40 are placed along drum 14. When piston 50 is in the retracted position shown in FIG. 1, apertures 102 are not aligned with apertures 40. As such, fluid may not pass through apertures 40. When piston 50 is placed in the advanced position as shown in FIG. 2, apertures 102 align with apertures 40 such that fluid may travel through both sets of apertures 40 and 102.

Clutch 10 also includes a reaction plate 110 placed in splined engagement with drum 14. A snap ring 112 is fixed to drum 14 to restrict reaction plate 110 from moving in one direction relative to drum 14.

The operation of clutch 10 will be described beginning with clutch 10 in the torque transferring or engaged mode where piston 50 is axially moved to the advanced position as shown in FIG. 2. Pressurized fluid is pumped through supply port 42 to apply a pressure to a back face 120 of piston 50. Both piston 50 and cover 90 axially translate such that engagement face 84 engages one of outer clutch plates 46 and apertures 102 are aligned with apertures 40. Force is transferred from piston 50 through each of outer clutch plates 46 and inner clutch plates 28 where the force is reacted by reaction plate 110. At this time, torque is transferred between hub 12 and drum 14. Furthermore, because apertures 102 are aligned with apertures 40, fluid may be pumped through a fluid path from a location outside of drum 14 through apertures 40, through apertures 102 and into contact with inner clutch plates 28 and outer clutch plates 46. The fluid is heated by the clutch plates. Fluid continues along the fluid path through apertures 26 extending through hub 12 through an exit port 122 to a location remote of clutch 10 so the fluid may be cooled.

FIG. 1 depicts piston 50 in the position corresponding to a disengaged clutch mode. In this mode of operation, pressurized fluid is not supplied through supply port 42 to act on piston 50. As such, return spring 82 drives piston 50 into contact with end wall 38 of drum 14. Engagement face 84 is spaced apart from outer clutch plates 46 and inner clutch plates 28. The inner and outer clutch plates are free to rotate relative to one another without transferring torque between hub 12 and drum 14. Because cover 90 is positioned to misalign apertures 102 and apertures 40, fluid is not pumped through apertures 40. Because fluid is not being re-supplied to clutch 10, fluid that may be in communication with inner clutch plates 28 and outer clutch plates 46 may pass through apertures 26 formed in hub 12 and through exit port 122. The quantity of fluid that was previously located between inner clutch plates 28 and outer clutch plates 46 is now reduced or removed. Resistance to relative rotation between drum 14 and hub 12 is also reduced due to eliminating or at least reducing the energy required to shear the fluid previously contacting inner clutch plates 28 and outer clutch plates 46. Accordingly, the torque required to rotate hub 12 relative to drum 14 is greatly reduced relative to a similarly configured wet clutch where fluid is continuously pumped over or in contact with inner clutch plates 28 and outer clutch plates 46.

It should be appreciated that while a staggered pattern for the placement of apertures 102 and apertures 40 has been disclosed, it is within the scope of the present disclosure to position the apertures along other aligned or misaligned patterns. Furthermore, it is also contemplated that cover 90 may be operated in conjunction with hub 12 and apertures 26 extending therethrough instead of drum 14 and apertures 40.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A clutch assembly adapted to transmit drive torque between first and second rotary components, the clutch assembly comprising:

a clutch hub fixed for rotation with the first rotary component and defining a cylindrical inner hub portion;

a clutch drum fixed for rotation with the second rotary component and defining a cylindrical outer drum portion aligned to generally surround said inner hub portion of said clutch hub, said outer drum portion having a plurality of drum apertures;

a clutch pack including a plurality of outer clutch plates fixed for rotation with and axially sliding movement on said outer drum portion and a plurality of inner clutch plates interleaved with the outer clutch plates and which are fixed for rotation with and axially sliding movement on said inner hub portion; and a piston moveable relative to said clutch pack to control the amount of drive torque transferred between said clutch drum and said clutch hub, wherein said piston is moveable between a retracted position corresponding to a disengaged clutch mode displaced from engagement with said clutch pack and an advanced position corresponding to an engaged clutch mode in engagement with said clutch pack, and wherein said piston includes a cover member configured to restrict a flow of fluid through said drum apertures when said piston is located in its retracted position and to permit the flow of fluid through said drum apertures when said piston is located in its advanced position.

2. The clutch assembly of claim 1 wherein said clutch pack is disposed in a clutch chamber defined between said inner hub portion, said outer drum portion, and a reaction plate fixed for rotation with one of said inner hub portion and said outer drum portion, and wherein said cover member restricts the flow of fluid through said drum apertures into said clutch chamber when said piston is positioned in its retracted position.

3. The clutch assembly of claim 2 wherein said clutch hub further includes a plurality of hub apertures formed through said inner hub portion and which are configured to permit fluid to be discharged from said clutch chamber when said piston is in one of its retracted and advanced positions.

4. The clutch assembly of claim 1 wherein said outer drum portion of said clutch drum includes a plurality of longitudinally-extending internal spline teeth configured for meshed engagement with said outer clutch plates of said clutch pack, and wherein said cover member includes a first ring fixed to said piston, a second ring, and a plurality of longitudinally-extending webs interconnecting said first ring to said second ring, and wherein said webs are aligned to be located in recesses formed between said internal spline teeth formed in said outer drum portion of said clutch drum.

5. The clutch assembly of claim 4 wherein said cover member further includes a plurality of cover apertures formed through said webs, and wherein said cover apertures are misaligned relative to said drum apertures when said piston is located in its retracted position and said cover apertures are aligned relative to said drum apertures when said piston is located in its advanced position.

6. The clutch assembly of claim 5 wherein said alignment of said cover apertures with said drum apertures when said piston is located in its advanced position acts to permit fluid to flow therethrough and into said clutch chamber for cooling said clutch pack.

7. The clutch assembly of claim 5 wherein each of said drum apertures is formed through said outer drum portion of said clutch drum and is axially offset relative to an adjacent drum aperture, wherein each of said cover apertures formed through said webs of said cover is axially offset relative to an adjacent cover aperture, and wherein said cover member of said piston is oriented relative to said clutch drum such that each cover aperture is arranged to control the flow of fluid through a corresponding one of said drum apertures in response to movement of said piston relative to said clutch drum.

8. The clutch assembly of claim 1 wherein said piston and clutch drum define a pressure chamber therebetween that can be supplied with pressurized fluid to selectively move said piston from its retracted position toward its advanced position.

9. The clutch assembly of claim 8 further comprising a biasing spring operably disposed between said piston and one of said clutch drum and said clutch hub to bias said piston for movement from its advanced position toward its retracted position.

10. The clutch assembly of claim 1 wherein said cover member is fixed for axial movement with said piston and includes cover apertures, wherein said cover apertures are aligned with said drum apertures when said piston is located in its advanced position to permit the flow of fluid therethrough for cooling said clutch pack, and wherein said cover apertures are misaligned with respect to said drum apertures when said piston is located in its retracted position to inhibit the flow of fluid into contact with said clutch pack.

11. The clutch assembly of claim 10 wherein said clutch hub includes hub apertures for permitting fluid in contact with said clutch pack to be drained.

12. A clutch assembly adapted to transmit drive torque between first and second rotary components, comprising:
a clutch hub fixed for rotation with the first rotary component;
a clutch drum fixed for rotation with the second rotary component and generally surrounding said clutch hub to define a clutch chamber therebetween, said clutch drum having at least one drum aperture extending therethrough;
a clutch pack operably disposed within said clutch chamber and including a plurality of first clutch plates fixed for rotation with said clutch drum and which are interleaved with a plurality of second clutch plates fixed for rotation with said clutch hub;
a piston operable for applying a clutch engagement force to said clutch pack based on movement between a retracted position and an advanced position; and
a cover moveable relative to said clutch drum between first and second position and having at least one cover aperture extending therethrough, said cover is operable in its first position to close said drum aperture and is operable in its second position to align said cover aperture with said drum aperture.

13. The clutch assembly of claim 12 wherein said cover is fixed to said piston such that said cover is located in its first position when said piston is in its retracted position and said cover is located in its second position when said piston is in its advanced position.

14. The clutch assembly of claim 13 further including at least one hub aperture formed through said clutch hub, wherein fluid flow into said clutch chamber through said drum aperture is restricted when said cover is located in its first position such that fluid is allowed to escape through said hub aperture so as to reduce resistance to relative rotation between said first and second clutch plates when said piston is located in its retracted position.

15. A clutch assembly of claim 14 wherein fluid flow into said clutch chamber is permitted through said drum aperture and said cover aperture when said cover is in its second position for use in cooling said clutch pack.

16. The clutch assembly of claim 13 wherein said cover includes a first portion fixed to said piston and a transversely extending second portion generally aligned in close proximity to an inner surface of said clutch drum, wherein said at least one drum aperture includes a plurality of circumferentially-spaced drum apertures, wherein said at least one cover aperture includes a plurality of circumferentially-spaced cover apertures extending through said second portion of said cover, and wherein each of said cover apertures is aligned relative to a corresponding one of said drum apertures such that movement of said cover from its first position to its second position relative to said clutch drum causes said cover apertures to move from a position of misalignment relative to said drum apertures into a position of alignment relative to said drum apertures.

17. The clutch assembly of claim 16 wherein said cover and said piston are fixed for common rotation with said clutch drum.

18. The clutch assembly of claim 16 wherein said clutch drum includes internal spline teeth extending from said inner surface, wherein said second portion of said cover includes a plurality of axially-extending web sections that are aligned to be located between adjacent internal spline teeth and in close proximity to said inner surface of said clutch drum, and wherein said plurality of said cover apertures are formed to extend through said web sections of said cover.

19. The clutch assembly of claim 16 wherein said cover further includes a third portion formed at an end of said second portion and which is configured to generally surround an end portion of said clutch drum so as to guide said cover during axial sliding movement of said cover relative to said clutch drum.

20. A method of reducing drag losses in a clutch assembly, the method comprising:
provided a clutch assembly having a clutch hub, a clutch drum rotatable relative to said clutch hub, a clutch pack of inner and outer clutch plates disposed in a clutch chamber defined between said clutch hub and said clutch drum, a moveable piston, and a moveable cover;
moving said piston from a retracted position into an advanced position for applying a clutch engagement force on said clutch pack to transfer drive torque between said clutch hub and said clutch drum;
moving said cover from a first position into a second position to allow fluid to flow through a drum aperture formed through said clutch drum and a cover aperture formed through said cover by aligning said cover aperture with said drum aperture;
flowing fluid through said drum aperture and said cover aperture into said clutch chamber to lubricate and cool said clutch plates;
moving said piston from its advanced position into its retracted position to release said clutch engagement force and discontinue torque transfer between said clutch hub and said clutch drum; and
moving said cover from its second position into its first position for interrupting the flow of fluid through said drum aperture and said cover aperture into said clutch chamber.

21. The clutch assembly of claim 20 further including the steps of fixing said cover for movement with said piston relative to said clutch drum, and securing said cover for rotation with said clutch drum.

22. A clutch assembly adapted to transmit drive torque between first and second rotary components, comprising:
a first clutch component, which is a clutch drum, fixed for rotation with the first rotary component and having a first aperture extending there through;
a second clutch component, which is a clutch hub, fixed for rotation with the second rotary component;
a clutch pack disposed in a clutch chamber defined between said first and second clutch components and operable for transferring drive torque between the first and second clutch components in response to a clutch engagement force applied to said clutch pack;
a piston operable for applying said clutch engagement force to said clutch pack in response to movement from a retracted position toward an advanced position;
a cover configured to restrict a flow of lubricating fluid through said first aperture into said clutch chamber when said piston is located in its retracted position and to permit the flow of lubricating fluid through said first aperture into said clutch chamber to cool said clutch pack when said piston is located in its advanced position; and
a biasing member for biasing said piston toward its retracted position, wherein said cover includes a second aperture and is moveable relative to said first clutch component between first and second positions, wherein said cover is operable in its first position to misalign said second aperture relative to said first aperture to restrict the flow of lubricating fluid into said clutch chamber, and wherein said cover is operable in its second position to align said second aperture with said first aperture to permit the flow of lubricating fluid into said clutch chamber.

23. The clutch assembly of claim 22 wherein said cover is fixed for common axial movement with said piston relative to said first clutch component, wherein said cover is located in its first position when said piston is in its retracted position and said cover is located in its second position when said piston is in its advanced position, and wherein said second clutch component includes a third aperture configured to permit lubricating fluid to drain from said clutch chamber.

* * * * *